United States Patent [19]
Arrone

[11] Patent Number: 5,573,205
[45] Date of Patent: Nov. 12, 1996

[54] PULL CORD TENSION TRANSMITTING DEVICE USING DUAL RACK-PINION

[75] Inventor: Armand J. Arrone, Massapequa, N.Y.

[73] Assignee: Grumman Aerospace Corporation, Los Angeles, Calif.

[21] Appl. No.: 352,234

[22] Filed: Dec. 8, 1994

[51] Int. Cl.⁶ ....................................................... B64D 25/11
[52] U.S. Cl. .............. 244/122 A; 74/89.17; 244/122 AD; 244/122 AE; 244/122 AH
[58] Field of Search ......................... 244/122 A, 122 AB, 244/122 AC, 122 AD, 122 AE, 122 AF, 122 AG, 122 AH; 74/89.17

[56] References Cited

U.S. PATENT DOCUMENTS 3,214,118  10/1995  Martin ............................... 244/122 AG
5,133,515  7/1995   Strattan et al. ...................... 244/122 A Primary Examiner—Andres Kashnikow
Assistant Examiner—Tien Dinh
Attorney, Agent, or Firm—Terry J. Anderson; Karl J. Hoch, Jr.

[57] ABSTRACT

A first rack is maintained in spatial relationship from a pinion so that the rack may be moved vertically with a pilot's seat, thereby accommodating height adjustments. An actuating handle is connected, via a cable, to a linkage which displaces the rack toward engagement with a pinion gear. A second rack is normally maintained in engagement with the same pinion gear and is driven by it. When the pinion gear is driven by the first rack, the second rack follows and it pulls upon a cable connected at an opposite end to a seat firing head.

5 Claims, 1 Drawing Sheet

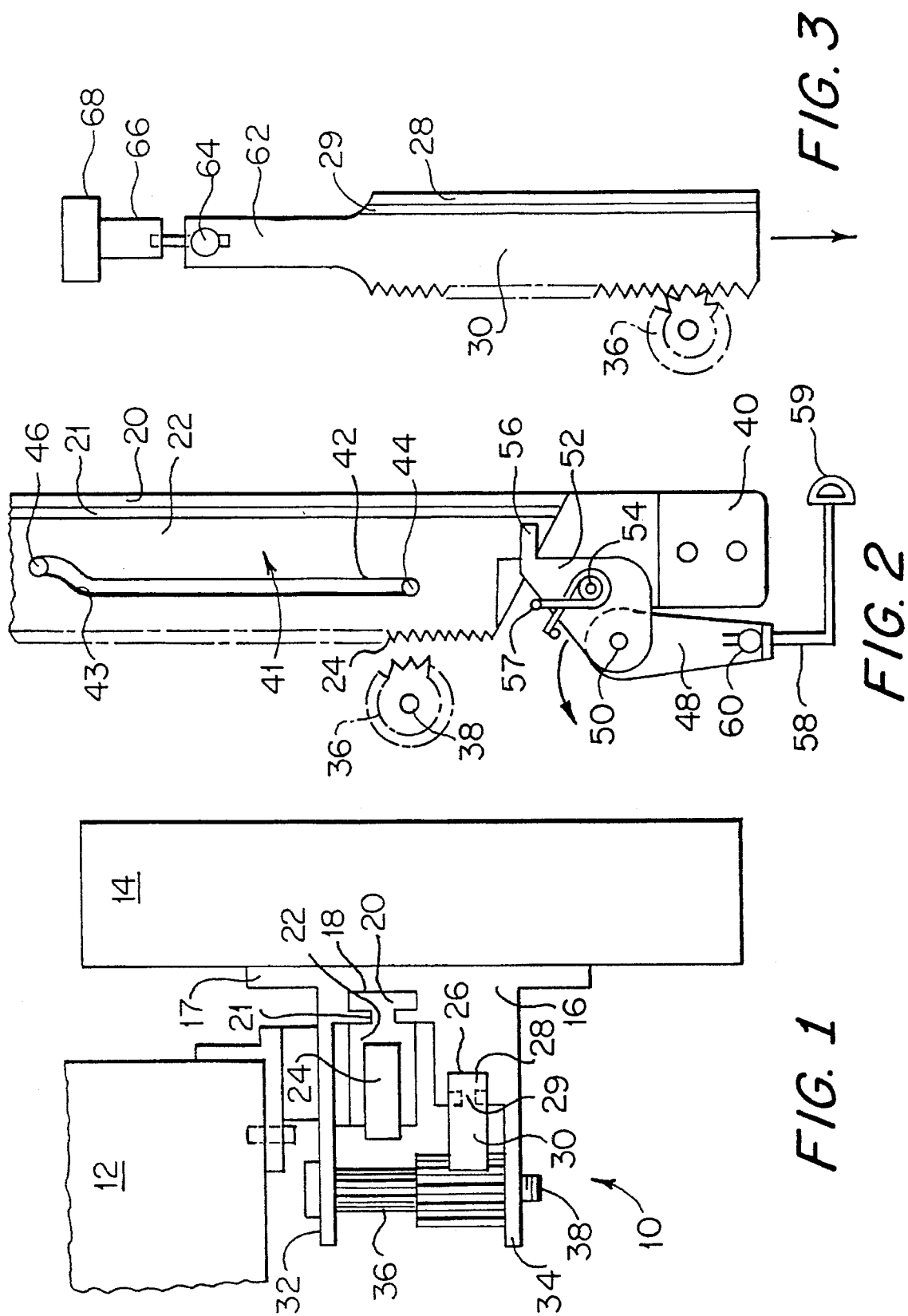

PULL CORD TENSION TRANSMITTING DEVICE USING DUAL RACK-PINION

FIELD OF THE INVENTION

The present invention relates to manual tension transmitting devices, and, more particularly, to such a device employing dual rack and pinion mechanisms.

BACKGROUND OF THE INVENTION

Pilot ejection seats incorporate a pull handle for actuating a seat firing head. Among the current applications, a handle transmits motion through a stranded cable housed within a nylon-lined flexible conduit. Frequently, the load required to effectively move the handle and cable becomes quite high, which introduces a safety problem for the pilot. For example, increased handle loads may occur in extremely cold temperatures where binding develops between the cable and its housing.

BRIEF DESCRIPTION OF THE PRESENT INVENTION

The present invention offers a dual rack-and-pinion mechanism which transmits motion from the handle and connected cable to a seat firing head with reduced handle load.

The present invention is mounted to pilot seat fittings and enables normal adjustment of a seat bucket for accommodating pilots of varying heights.

The present invention offers a simple yet reliable and elegant approach to solving a long-felt need.

BRIEF DESCRIPTION OF THE FIGURES

The above-mentioned objects and advantages of the present invention will be more clearly understood when considered in conjunction with the accompanying drawings, in which:

FIG. 1 is a vertical, partial, cross-sectional view of the present invention.

FIG. 2 is a side elevational view of a first moveable rack incorporated in the present invention.

FIG. 3 is a side elevational view of shortened rack which is driven by the longer rack of FIG. 2 and which actuates a seat firing head when driven.

DETAILED DESCRIPTION OF THE INVENTION

The dual rack-and-pinion mechanism of the present invention is generally indicated by reference numeral 10 in FIG. 1. The mechanism is mounted to the side of a pilot seat bucket 12. The pilot seat beam (chassis) is indicated by reference numeral 14 and remains stationary. The bucket moves vertically (in and out of the plane of the paper). Reference numeral 16 illustrates a system support fitting having flanges 17 secured to the seat beam 14. The fitting has a generally T-shaped spline 18 extending along the length of the fitting 16. The spline receives a journaled rack support fitting 20. Opposing support fitting parallel flanges 22 extend from a T-shaped section 21 and are temporarily fixed to an elongated rack 24, shown in FIG. 2. During normal (non-ejection mode) operation of an aircraft, the seat bucket 12 may be adjusted vertically to accommodate a pilot's height. Such adjustment is accompanied by linked displacement of the rack mechanism shown in FIG. 2. In other words, long rack 24 and support fitting (20, 21, 22) move vertically with the seat bucket during adjustments.

In the event pilot ejection becomes necessary, rack 24 is displaced downwardly, as will be discussed shortly hereafter, causing tension transmission to a second shorter rack 30, shown in FIGS. 1 and 3. This second rack 30 has a T-shaped flange 28 extending along its length and narrowed at an elongated neck portion 29. The flange and neck are received within the system support fitting and normally remain stationary within that fitting. The rack 30 remains permanently engaged with the pinion 36.

Referring back to FIG. 2, since the pinion 36 remains normally disengaged from the driver rack 24, there is no motion transmission between the fitting 36 and the rack 30.

Referring to FIG. 1 again, the pinion 36 is seen to be mounted on a shaft 38, which is, in turn, mounted to a clevis constituting parallel spaced flanges 32 and 34 of the system support fitting 16.

Referring to FIG. 2, the lower portion of the longer rack assembly is indicated as being attached to the seat bucket through bracket 40. This causes linked vertical movement between the longer rack assembly and the seat bucket. The rack support fitting 20, shown in FIG. 2, includes an elongated slot 41 having a first lengthened portion 42 and a second offset parallel portion 43. A lower pin 44 and upper pin 46 traverse the rack support fitting 21 and pass through their respective ends of the slot 41.

When the pilot's seat is to be ejected, the handle 59 (FIG. 2) is pulled. Tension is transmitted along cable 58 to a connection 60 with link 48 pivotally connected at 50 to a second locking link 52. Link 52 is pivotally mounted at 54 and retained in its normal position by means of a coil spring 57, mounted to the pivot 54. A nose 56 projects from the link 52 and normally maintains a frictional engagement with a corresponding surface of the bracket 40. Pulling handle 59 translates to displacement of the links 48 and 52, the later link being displaced counter-clockwise, as viewed in FIG. 2. This releases the nose 56 from engagement with bracket 40 and frees the rack 24 from its normally journaled relationship within the rack support fitting 22.

Pulling handle 59 not only frees engagement between nose 56 and the bracket 40, but also causes compound motion of the rack downwardly and to the left so that the rack engages pinion 36 and causes it to rotate clockwise, as viewed in FIG. 2. The clockwise rotation of the pinion 36 causes downward displacement of the short rack 30 shown in FIG. 3. Pinion 36 can have a single, or two diameters (as shown) so that it can give the mechanism mechanical advantage or disadvantage. Pull on nose 56 would vary accordingly.

Upper end 62 of rack 30 is connected at 64 to a cable 66. An opposite end of the cable is connected to a conventional seat ejection firing head 68. Upon sufficient pulling of the handle 59 (FIG. 2), the head 68 causes firing of conventional seat ejection means which do not, per se, form part of the present invention.

As will be appreciated from the foregoing description of the invention, the present dual rack-and-pinion mechanism provides a simple and reliable means of actuating a seat firing head with reduced handle loads, as compared with the prior art.

It should be understood that the invention is not limited to the exact details of construction shown and described herein for obvious modifications will occur to persons skilled in the art.

I claim:

1. A rack mechanism for transferring manual pulling movement, the mechanism comprising:

a system support fitting secured to a stationary object;

a rack support fitting journaled within the support fitting;

the first rack slidably mounted in the support fitting and having rack teeth extending outwardly from an edge of the support fitting;

means for normally maintaining the rack in stationary relation within the support fitting, allowing them to move together;

a slot formed in the rack support fitting;

at least on guide pin extending from the rack through the slot for guiding sliding motion of the rack within the support fitting after their relative displacement;

a pinion positioned in normally disengaged relation from the rack, and in engaged relation after relative displacement between the rack and the support fitting;

a first link connected at a first end thereof to a pulled tensioning member;

a second end of the first link being connected to the first end of a second link;

the second link being displaced upon pulling of the tensioning member and correspondingly causing the rack to swing away from the support fitting and into driving engagement with the pinion;

a second rack positioned in parallel spaced relation to the first rack, the second rack normally engaging the pinion;

the driving engagement of the pinion by the first rack causing commensurate displacement of the second rack; and means attached to the second rack for actuating a utilization device upon displacement of the second rack.

2. The mechanism set forth in claim 1 wherein the tensioning member is a cable having an outward end connected to a pull handle.

3. The mechanism set forth in claim 1 wherein the slot includes:

(a) a first length; and (b) a second shortened length, offset relative to the first length.

4. A dual rack mechanism for transferring manual pulling movement to actuate a pilot ejection seat firing head, the mechanism comprising:

a system support fitting secured to a stationary seat chassis;

a rack support fitting connected to a bucket of the seat and journaled within the support fitting for allowing sliding of the rack support fitting with corresponding vertical adjustment of the seat;

the first rack slidably mounted in the support fitting and having rack teeth extending outwardly from an edge of the support fitting;

means for normally maintaining the rack in stationary relation within the support fitting, allowing them to move together;

a slot formed in the rack support fitting;

at least on guide pin extending from the rack through the slot for guiding sliding motion of the rack within the support fitting after their relative displacement;

a pinion positioned in normally disengaged relation from the rack, and in engaged relation after relative displacement between the rack and the support fitting;

a first link connected at a first end thereof to a pull cable;

a second end of the first link being connected to the first end of a second link;

the second link being displaced upon pulling of the pull cable and correspondingly causing the rack to swing away from the support fitting and into driving engagement with the pinion;

a second rack positioned in parallel spaced relation to the first rack, the second rack normally engaging the pinion;

the driving engagement of the pinion by the first rack causing commensurate displacement of tile second rack; and means attached to the second rack for actuating a seat firing head upon displacement of the second rack.

5. The mechanism set forth in claim 4 wherein the slot includes:

(a) a first length; and (b) a second shortened length, offset relative to the first length.

* * * * *